Sept. 29, 1959  B. A. KNAUTH  2,906,121
FLOWMETER
Filed Sept. 2, 1955  3 Sheets-Sheet 1

Inventor:
Berthold A. Knauth,
by Andros and Smith
His Attorneys

Inventor:
Berthold A. Knauth,
by Andros and Smith
His Attorneys

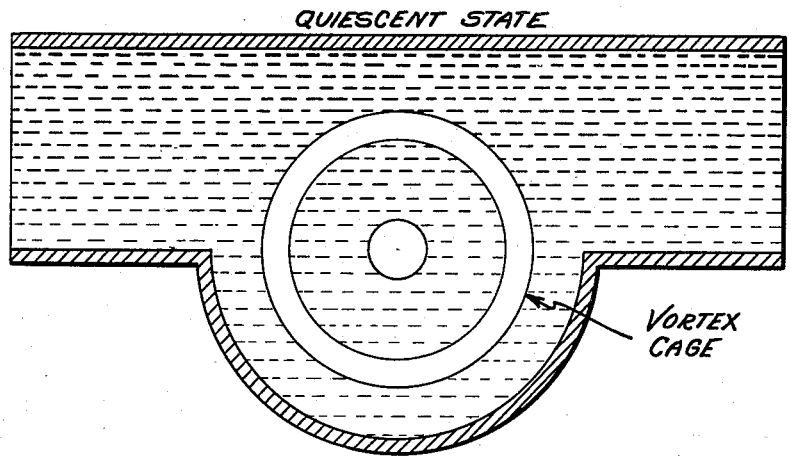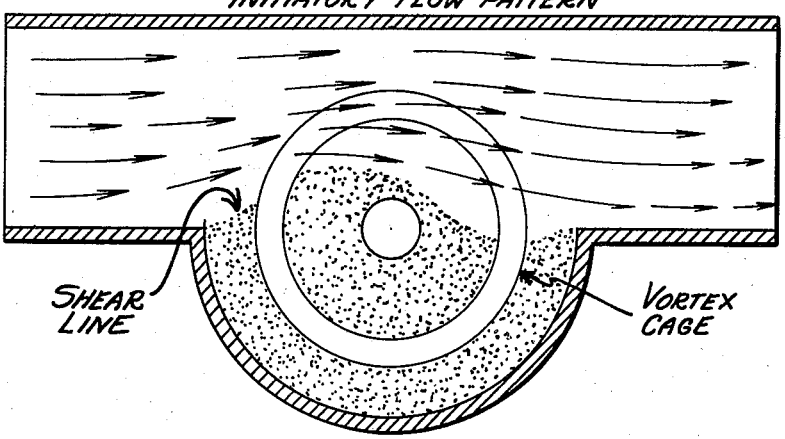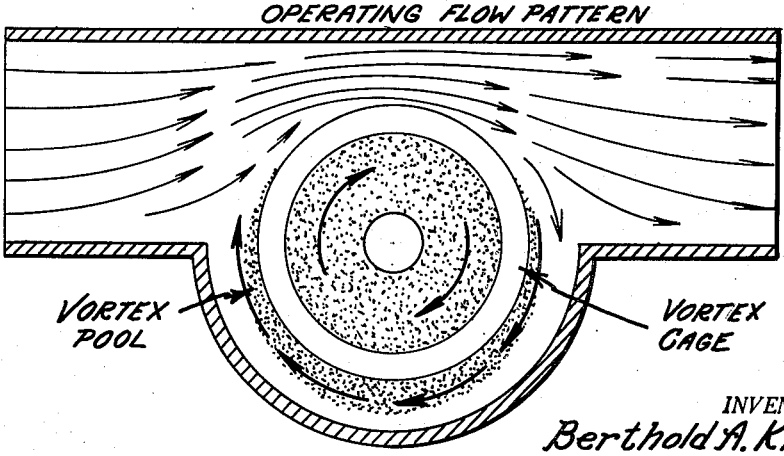

United States Patent Office 2,906,121
Patented Sept. 29, 1959

2,906,121

FLOWMETER

Berthold A. Knauth, High Falls, N.Y.

Application September 2, 1955, Serial No. 532,187

8 Claims. (Cl. 73—229)

This invention has to do with improvements in fluid flowmeter devices, having particular reference to a method and means for creating a vortex, in a portion of the fluid flowing therein, whose rate of rotation bears a linear relation to the velocity of flow of the fluid, and counting the number of revolutions of such portion of fluid circulating in the vortex, and the provision of such a method and means in relation to such a device is the principal object of the invention.

I am well aware of the patented and other literature pertaining to flowmeters. Many such meters heretofore have been devised or suggested but they have failed to provide an efficient means and method for giving optimum and accurate results. There has been a long felt want in the industry for a means and method for overcoming the foregoing and other previous difficulties and disadvantages and this has now been accomplished by the present invention. This is based upon my discovery that when fluid is passed through a tube or conduit, under proper conditions, a so-called metastable vortex can be created and maintained in a portion of the fluid to provide ideal laminar flow without turbulence, whereby the rate of rotation of the fluid in the vortex bears a linear relation to the velocity of the fluid flowing through the conduit, the number of revolutions of which can be counted by the insertion within the vortex of a rotatable indicator which will generate and sustain such vortex. By way of explanation, the flow of fluid through the conduit with respect to such a vortex might be thought of as a belt and pulley during operation when the operating flow pattern, forming a vortex pool, is once established, immediately following the forming of an initiatory flow pattern from a quiescent state.

Generally, therefore, in addition to overcoming the foregoing difficulties and disadvantages, it is an object of the invention to provide a fluid flowmeter that is economic of manufacture, simple, yet sturdy and durable of construction, positive and accurate in operation, and which will operate with relative freedom from wear and tear, as well as other mechanical or operational difficulties.

More specifically, it is an object of the invention to provide a fluid flowmeter comprising a conduit for the passage of fluid therethrough, having an inlet at one end and an outlet at the other end, preferably in coaxial alignment with each other, means disposed intermediate said inlet and outlet for creating a vortex, or vortex pool, in a portion of said fluid laterally of its axis of flow, whose rate of rotation bears a linear relation to the flow velocity of the fluid in the conduit, and means for counting the number of revolutions of the fluid circulating in the vortex.

Other objects of the invention will in part be obvious and will in part appear hereinafter.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which—

Figs. 5, 6 and 7 are diagrammatic illustrations depicting my flowmeter with the fluid in a quiescent state, the setting up of an initiatory flow pattern, and the final operating flow pattern, respectively.

Figure 1:
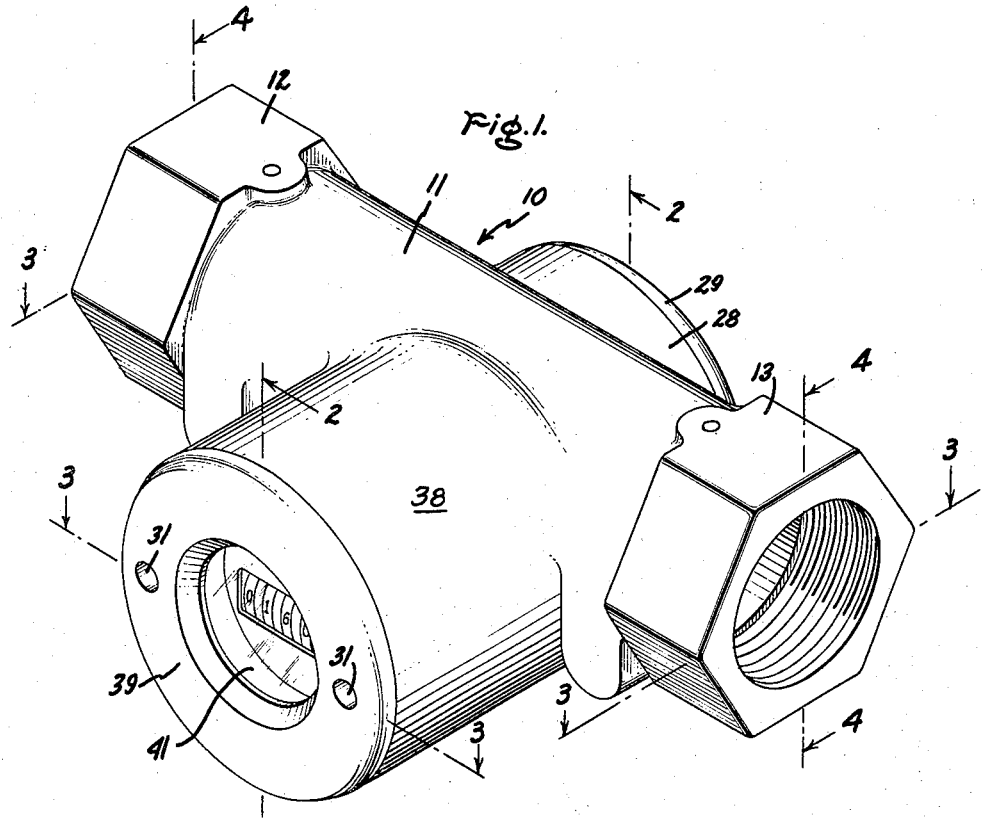
Fig. 1 is a perspective view of a preferred type of device embodying the invention.
Figure 2:
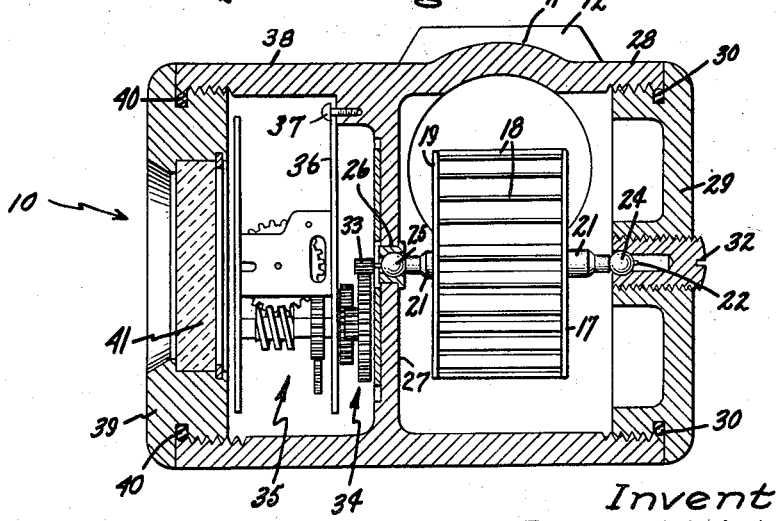
Fig. 2 is a sectional view taken along the lines 2—2 of Fig. 1.
Figure 3:
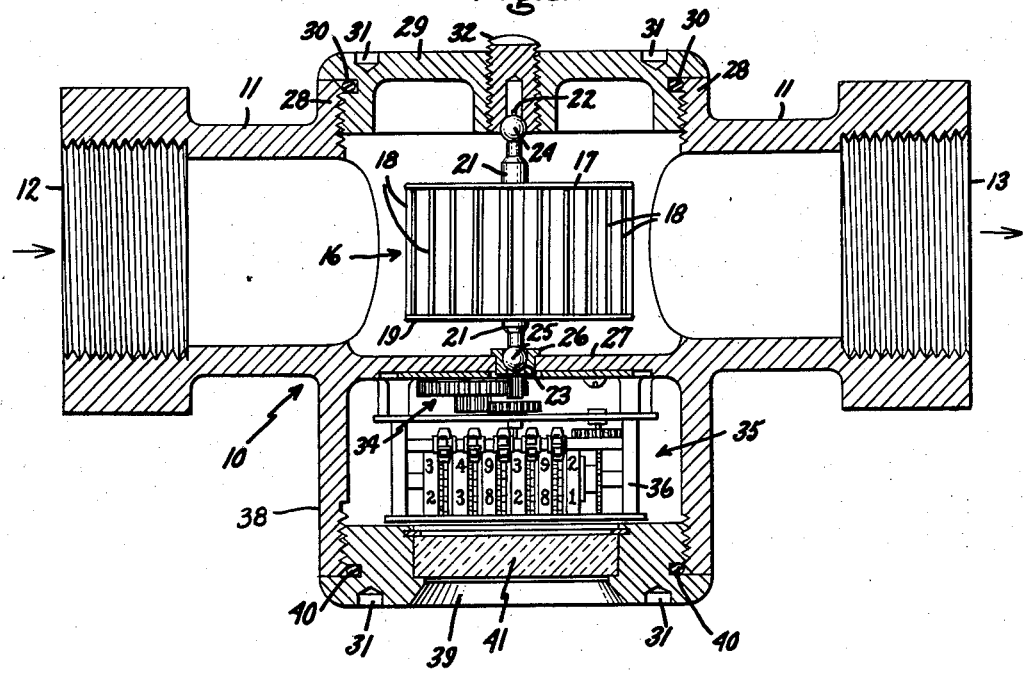
Fig. 3 is a sectional view taken along the lines 3—3 of Fig. 1.

Referring more particularly to the drawings, there is indicated generally at 10 a flowmeter embodying the present invention that is adapted to be coupled in a pipe line for the passage of fluid therethrough to be measured.

Such a flowmeter comprises a conduit 11 having a threaded inlet 12 at one end and a threaded outlet 13 at its other end.

Between the inlet 12 and the outlet 13 there is provided a wall 14 extending laterally of the conduit to form a vortex-forming cavity 15 which preferably is semicircular in configuration.

Mounted approximately at the geometric center of the cavity 15 is a wheel or cage preferably of the so-called squirrel-cage type, as indicated generally at 16. This wheel comprises a disk 17 forming one side thereof around which are disposed a plurality of blades 18 that are concavo-convex in cross section. At their opposite ends the blades are connected together by a ring 10. At the center of the disk 17 is a hub 20 through which passes a shaft 21 that is secured to the hub in any suitable manner. The shaft at opposite ends terminates in stem shafts 22 and 23 that are of small diameter. A spherical bearing 24, preferably of suitable plastic, is mounted on the stem shaft 22, and a similar bearing 25 is mounted on the stem shaft 23. In order to support the wheel in rotatable position, the spherical bearing 25 is mounted in a second bearing 26 which in turn is secured to a flat wall 27 of the conduit 11. The side of the conduit opposite the wall 27 is provided with an opening so that the wheel readily can be mounted. This opening is defined by an internally threaded circular flange 28 that is integral with the conduit. An externally-threaded cover plate 29 is adapted to be received by the threaded flange portion 28 and is held in sealed position by a ring gasket 30. Openings 31 are provided in the cover plate to receive a spanner wrench for tightening the cover plate. Centrally of the cover plate 29 is a threaded sleeve bearing 32 in coaxial alignment with the bearing 26 in the flat wall 27 of the conduit, and the other spherical bearing 24 is mounted within this sleeve bearing 32.

It should be noted at this point that the wheel or cage 16 is somewhat larger in diameter than the diameter of the conduit 11. It should also be observed that there is a substantial space between the periphery of that portion of the wheel which rotates within the cavity 15 and the cavity wall 14. It will further be observed that there is a much greater space between the periphery of the wheel and the wall of the conduit opposite the cavity. In fact, it is essential to proper operation of the device that the wheel 17 extend into the conduit a distance such that the longitudinal axis of the latter is at least tangent thereto and, preferably, the size of the wheel should be such that it extends even a short distance beyond, or transversely of, the longitudinal axis of the conduit. In other words, the wheel, or vortex cage, should rotate tangentially with respect to the longitudinal lines of flow of the fluid in the conduit 11, or, otherwise stated, the fluid flows tangentially to the laminae constituting the vortex.

On the stem shaft 23 is a pinion 33 adapted to motivate a gear train indicated generally at 34, which in turn actuates a counter mechanism 35 of conventional construction. Such counter mechanism is mounted in a frame 36 adjacent the flat wall 27 of the conduit by means of screws 37.

Integrally cast with the conduit is a cylindrical housing 38 for the gear train 34 and the counter mechanism 35. The housing is internally threaded adjacent its outer edge to receive a second externally threaded cover plate 39, on coaxial alignment with the cover plate 29, which is held in sealed relation thereto by another ring gasket 40 and this cover plate also is provided with holes 31 for a spanner wrench. The cover plate 39 has a central opening therein which carries a window pane 41 through which the counter mechanism can be observed, as illustrated in Fig. 1.

Figure 4:
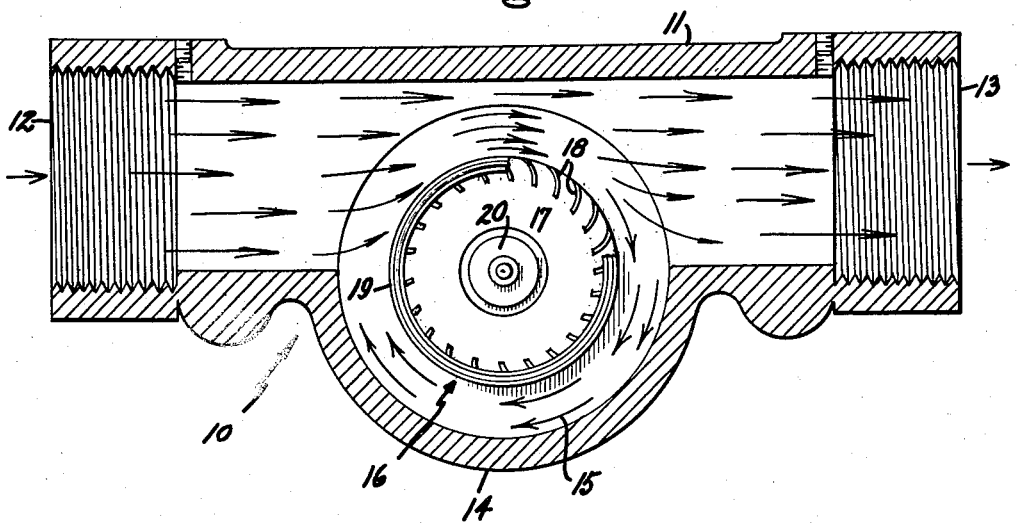
Fig. 4 is a sectional view taken along the lines 4—4 of Fig. 1.

In operation the device is relatively simple. As heretofore set forth, my invention is based upon the principle of a vortex, or vortex-pool, that is created within the conduit. (See Fig. 4.) However, by way of explanation, it might be said that in the absence of the wheel, or vortex-cage 16, different phenomena may occur as a fluid is passed through the conduit. This, especially when there is low velocity, may take the form of an expanded flow as the cavity is reached and create turbulence. However, under pressure, or increased velocity, the flow of fluid will be in a contracted form (Fig. 4) as it passes through the cavity and will create a vortex. By experiment, I have observed that when such a vortex is laterally created in a portion of the fluid flowing through such a conduit, the rate of rotation of the fluid bears a linear relation to the velocity of the fluid flowing through the conduit and also that a laminar flow within the vortex occurs. If the velocity of the flow of fluid is such that the vortex is maintained I am able to count the number of revolutions of the flow of fluid in the vortex by the introduction into the latter of any suitable rotatable member. Preferably, however, since such a contracted flow is accompanied by the occurrence of a vortex that is metastable, and will not always occur unless it is generated and sustained, I utilize the wheel 16, illustrated in the drawing for the occasion, although it should be understood that it is within the contemplation of the invention to use any other suitable indicator means that will accomplish the purpose, which will enable counting the number of revolutions of the fluid circulating in the vortex, that bears a linear relation to the velocity of the fluid flowing through the conduit. It should definitely be understood that the wheel 16 does not perform the function of a paddle wheel such as that shown in the prior art. On the contrary, its function, because of its size and location with respect to the conduit wall and cavity is such that it is merely used to generate and sustain the vortex and otherwise performs as a counter merely. Such a wheel, or equivalent structure, can be so arranged or marked in a manner such that the number of revolutions thereof can be counted by any suitable means. However, it is expedient to have the rotating wheel drive a gear train which in turn can be utilized to actuate a conventional counter mechanism, as illustrated in the drawing and such devices are now in commercial use.

It is also within the contemplation of the invention to create a vortex other than by means of the lateral curved wall structure 14 that provides the cavity 15. For example, an internal wall structure that projects inwardly of the conduit has also been used, but for present purposes the embodiment herein illustrated is preferred.

The operation of the invention will even more readily be appreciated by reference to Figs. 5, 6 and 7. In Fig. 5 is shown the flowmeter with the fluid in a quiescent state immediately before operation begins. As the fluid begins to pass through the conduit 11, an initiatory flow pattern is established and a so-called compressed or restricted type of flow occurs in the conduit as illustrated by the flow lines in Fig. 6. Simultaneously, that portion of the fluid in the cavity is gathered, or caused to be welled upwardly as defined by the portion labeled "shear line." As rotation of the vortex cage is thereby established, a vortex-pool is formed and an operating flow pattern is then established as illustrated in Fig. 7. It is significant that the fluid in the pool appears to be trapped as the vortex is sustained by the cage while the fluid flowing in the conduit passes over the vortex pool much in the manner of a belt and pulley as aforesaid.

It will thus be seen that the objects hereinbefore set forth may readily and efficiently be obtained and since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a vortex-velocity flowmeter of the character described, comprising a straight conduit for the free linear flow of fluid therethrough, a wall portion of said conduit being offset and having two spaced apart side walls connecting said offset portion and said conduit to provide a cavity to create a vortex therein formed from a portion of said fluid separated from the main flow, said vortex being rotated by said main flow around an axis extending transversely thereof, and a vortex cage rotatably mounted between said side walls to rotate coaxially with and to maintain said vortex, the peripheral surface of said cage being spaced substantially from said cavity wall, conduit wall, and side walls, said vortex being continuously maintained by peripheral discharge of fluid from said cage into said main flow from continuous axial flow into said cage of fluid between at least one end of said cage and its adjacent side wall, and whose rate of rotation bears a linear relation to the velocity of fluid flowing through said conduit.

2. In a device as defined in claim 1, and further characterized in that said cavity is semicircular and the axis of rotation of said rotatable vortex cage lies substantially in the plane of the opposite terminating ends of said cavity.

3. In a device as defined in claim 1, and further characterized in that said rotatable vortex cage is open-ended.

4. In a device as defined in claim 1, and further characterized in that said rotatable vortex cage is cylindrical, open at one end and closed at its other end by a disc, and a supporting shaft mounted coaxially of said disc for rotation with said cage.

5. In a device as defined in claim 1, and further characterized in that said side walls are in spaced parallel relation, and said rotatable vortex cage is mounted on an axis of rotation normal thereto.

6. In a device as defined in claim 1, and further characterized in that said side walls are in spaced parallel relation and said rotatable vortex cage is mounted on a shaft whose ends are journaled in said side walls.

7. In a vortex-velocity flowmeter of the character described, comprising a straight conduit for the free linear flow of fluid therethrough, a wall portion of said conduit being offset and having two spaced apart side walls connecting said offset portion and said conduit to provide a cavity to create a vortex therein formed from a portion of said fluid separated from the main flow, said vortex being rotated by said main flow around an axis extending transversely thereof, and a vortex cage rotatably mounted between said side walls to rotate with and to maintain said vortex, the peripheral surface of said cage being spaced substantially from said cavity wall, conduit wall, and side walls, said vortex being continuously maintained by peripheral discharge of fluid from said cage into said main flow from continuous axial flow into said cage of fluid between at least one end of said cage and its adjacent side wall, and means externally of one of said side walls cooperatively associated with said rotatable vortex cage to count the number of rotations thereof.

8. In a flowmeter of the character described, comprising a straight conduit for the free linear flow of fluid therethrough, a wall portion of said conduit being offset and having two spaced apart side walls connecting said offset portion and said conduit to provide a cavity to create a vortex therein formed from a portion of said fluid separated from the main flow, said vortex being rotated by said main flow around an axis extending transversely thereof, and a vortex member rotatably mounted between said side walls to rotate substantially coaxially with and to maintain said vortex, the peripheral surface of said rotatable member being substantially spaced from said cavity wall, conduit wall, and sidewalls, said vortex being continuously maintained by peripheral discharge of fluid from said member into said main flow from continuous axial flow to said member of fluid between at least one end of said member and its adjacent side wall, and whose rate of rotation bears a linear relation to the velocity of fluid flowing through said conduit.

References Cited in the file of this patent

UNITED STATES PATENTS

| 1,091,481 | Burton | Mar. 31, 1914 |
| 2,018,361 | Henszey | Oct. 22, 1935 |

FOREIGN PATENTS

| 268,770 | Italy | Oct. 28, 1929 |

OTHER REFERENCES

Publication, "Stroboflow," Flow Meter Corp. of America, High Falls, New York, 4 pages copy received September 13, 1948.